(12) United States Patent
Mallard

(10) Patent No.: US 9,019,071 B1
(45) Date of Patent: Apr. 28, 2015

(54) METHOD AND APPARATUS FOR INTEGRATING A PLURALITY OF LEGACY ACCESS CONTROL SYSTEMS WITH PARTITIONABLE RESOURCES

(76) Inventor: George Mallard, The Woodlands, TX (US)

(*) Notice: Subject to any disclaimer, the term of this patent is extended or adjusted under 35 U.S.C. 154(b) by 651 days.

(21) Appl. No.: 13/226,379

(22) Filed: Sep. 6, 2011

(51) Int. Cl.
| | |
|---|---|
| *G05B 19/00* | (2006.01) |
| *G08C 19/00* | (2006.01) |
| *G07C 9/00* | (2006.01) |
| *G08C 17/00* | (2006.01) |
| *G08B 29/00* | (2006.01) |
| *G06F 21/35* | (2013.01) |

(52) U.S. Cl.
CPC ............ *G08C 19/00* (2013.01); *G07C 9/00111* (2013.01); *G08C 17/00* (2013.01); *G07C 9/00904* (2013.01); *G08B 29/00* (2013.01); *G06F 21/35* (2013.01); *G07C 9/00087* (2013.01); *G07C 9/00007* (2013.01)

(58) Field of Classification Search
CPC .... G08C 19/00; G08C 17/00; G07C 9/00111; G07C 9/00904; G07C 9/00087; G07C 9/00007; G08B 29/00; G06F 21/35
USPC .................................. 340/5.6, 5.3, 5.8, 5.86
See application file for complete search history.

(56) References Cited

U.S. PATENT DOCUMENTS

| | | | | |
|---|---|---|---|---|
| 6,456,239 | B1* | 9/2002 | Werb et al. .................... | 342/463 |
| 6,484,260 | B1* | 11/2002 | Scott et al. .................... | 713/186 |
| 8,183,980 | B2* | 5/2012 | Davis et al. .................... | 340/5.8 |
| 8,222,990 | B2* | 7/2012 | Gerner et al. .................. | 340/5.2 |
| 8,339,271 | B2* | 12/2012 | Tabib ............................ | 340/653 |
| 2002/0186121 | A1* | 12/2002 | Yoshikawa et al. .......... | 340/5.28 |
| 2004/0140906 | A1* | 7/2004 | Fujimoto ................. | 340/825.49 |
| 2006/0017541 | A1* | 1/2006 | Nguyen ....................... | 340/5.81 |
| 2007/0057057 | A1* | 3/2007 | Andresky et al. ............. | 235/451 |
| 2008/0046984 | A1* | 2/2008 | Bohmer et al. .................... | 726/5 |
| 2008/0216156 | A1* | 9/2008 | Kosaka ............................ | 726/4 |
| 2010/0217669 | A1* | 8/2010 | Gazdzinski ................ | 705/14.52 |
| 2011/0120814 | A1* | 5/2011 | Schuster ...................... | 187/389 |
| 2011/0247901 | A1* | 10/2011 | Wilke et al. .................. | 187/247 |
| 2012/0138390 | A1* | 6/2012 | Koba ............................ | 187/247 |
| 2012/0139694 | A1* | 6/2012 | Pineau et al. .................. | 340/5.6 |
| 2013/0049928 | A1* | 2/2013 | Moore et al. ................. | 340/5.51 |

\* cited by examiner

*Primary Examiner* — Quang D Pham

(57) ABSTRACT

A method and apparatus to integrate a plurality of sets of authorized credentials from a plurality of building tenants is disclosed, using networking techniques to allow partitioned access to common resources shared by those tenants.

21 Claims, 8 Drawing Sheets

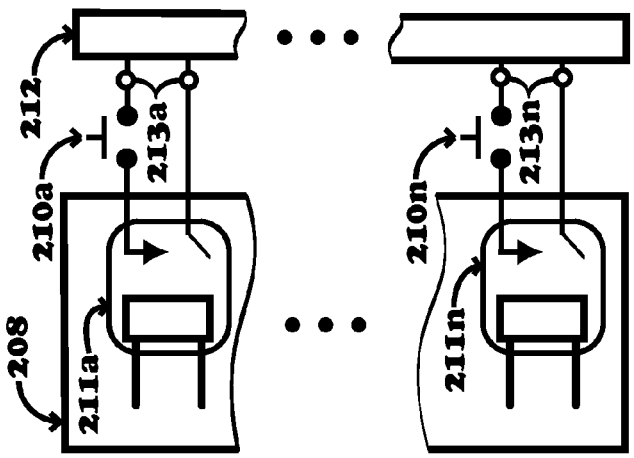
FIG. 2C
(Prior Art)
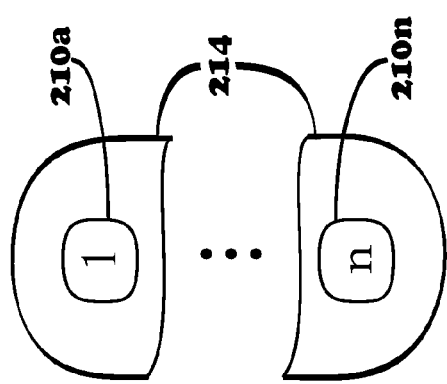
FIG. 2B
(Prior Art)
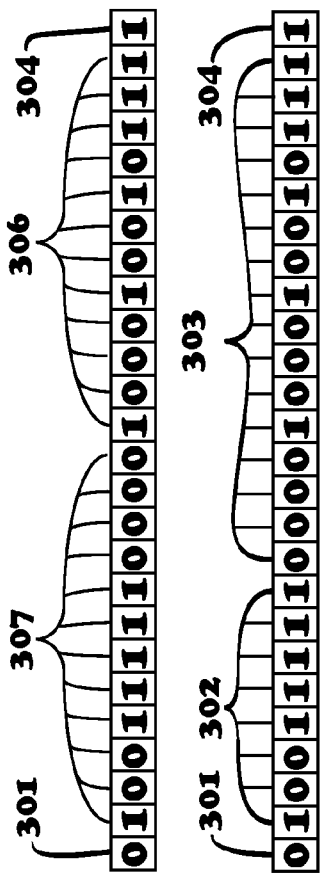
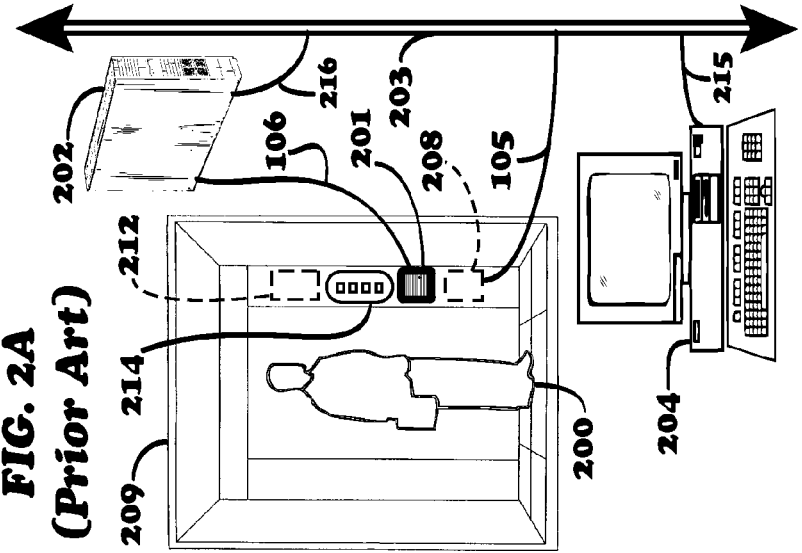
FIG. 2A
(Prior Art)
FIG. 3A
(Prior Art)
FIG. 3B
(Prior Art)

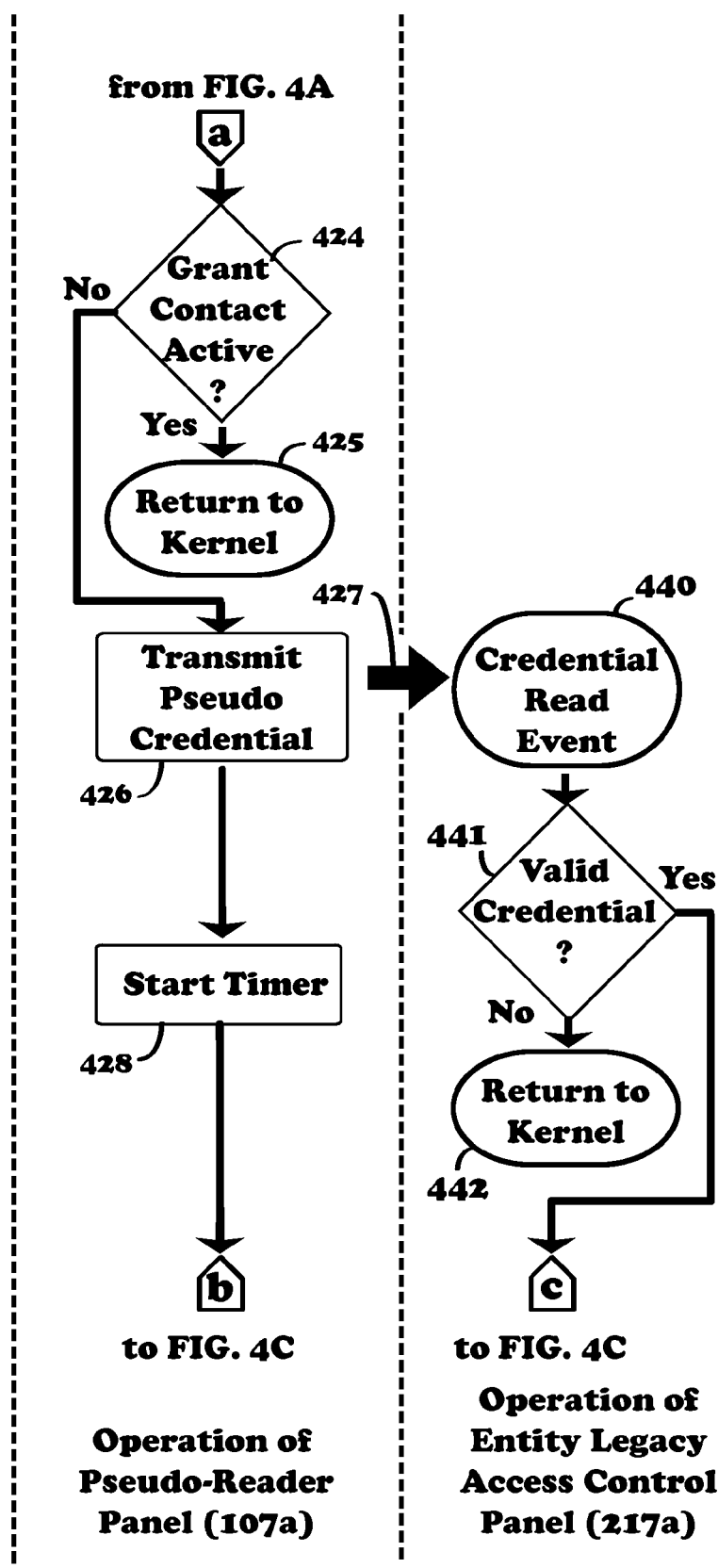

METHOD AND APPARATUS FOR INTEGRATING A PLURALITY OF LEGACY ACCESS CONTROL SYSTEMS WITH PARTITIONABLE RESOURCES

FIELD OF THE INVENTION

This invention relates generally to microprocessor based security systems, and more particularly to electronic security systems where a access control input, such as a card or biometric reader, is used to generate an electrical code.

BACKGROUND OF THE INVENTION

For over thirty years, access control systems have been used to control access to all or parts of buildings. For example, such systems can impede unauthorized personnel from using the elevators to gain access to particular floors of a building. Upon entering the elevator cab in an access controlled elevator, an unauthorized person may find all of the floor select buttons unresponsive.

After presenting an authorized credential to a credential reader within the cab of an elevator, a person may be allowed to make particular floor selections. The access control system, upon receiving the access control indicium from the credential reader, responds by releasing the exclusions on the set of authorized floor select buttons for that credential. The person makes his selection from this authorized set and the elevator then responds by delivering the person to the selected floor.

Those of skill in the art will recognize that an access control indicium may be any of a variety of signals and may include, without limitation, numeric codes, such as a magnetically encoded control number on an access card, or biometric data. Accordingly, "access control indicium" as used herein refers to any information provided, directly or indirectly, by a person seeking access to a building. Similarly, a "credential reader" provides a data input to an access control system, and includes, without limitation, conventional card readers as well as more sophisticated devices such as biometric scanners.

In many real estate settings, common areas and resources may be shared among several different tenants. These common resources must be used to provide access to the tenants' private areas. For example, in an office tower tenants share the lobby, parking areas, high volume air conditioning (HVAC), and elevators. During off hours, these common resources are usually restricted to authorized individuals. In the case of elevators or HVAC, only parts (partitions) of the entire building's resource may be utilized by a tenant's authorized employee. Each tenant may wish access for thousands of individuals to these resources to comfortably access its private space.

For example, a high rise office tower may house several large corporations. Those corporations could desire access for all their employees to employee amenities like an automated teller machine (ATM) or a cafeteria. It has long been common practice for each tenant to equip their personnel with electronically readable credentials (coded indicia), which serve as a key to access the tenants' private areas. These credentials, when used in conjunction with electrically controlled locks on the building portals, are known as card access systems. The advantages of card access systems are well known to the owners and managers of these properties.

As these systems have proliferated, it has become common for each tenant within the building to purchase its own proprietary access control systems. The owners and managers of these properties desire to accommodate each tenants' desire to grant access to authorized individuals, yet deny access to all others. The property managers have essentially four choices: (1) issuing their own credentials to all authorized people; (2) allowing each tenant to mount its own credential reader and controls at the building portals; (3) requiring each tenant to periodically share its list of authorized credentials with the property management; or (4) exposing each tenants' credential databases on a common network. Each of these four techniques has significant disadvantages as described below.

Issuing everyone their own building management credential has several disadvantages. First, it requires the purchase and distribution of credentials for everyone authorized to use the common spaces afterhours. Typically, the common area credentials are incompatible with the tenants' proprietary standards for credentials. Therefore, this technique often requires the individuals to carry multiple credentials. Additionally, the building management must synchronize their credential list with changes from each tenant's roster. The typical implementation is a manual system of faxed or emailed paper work. A common problem with a manual system is the building's database becoming "stale" with outdated information.

The result can be terminated individuals still having access to the building and newly hired individuals being denied access because the system which transmits the changes from the tenant to the building management has broken down or is slow. Problems can range from inconvenience for the newly hired to a potentially dangerous situation where an aggressive terminated employee has after-hours access to the common areas.

Allowing each tenant to mount its own credential reader and control system on the building portals results in an aesthetically disagreeable and confusing collage of credential readers at each of the building resource portals. It is difficult and expensive to integrate more than one access control system with partitioned resources, like elevators or HVAC systems. The expense and large number of interconnections required make ordinary integration techniques impractical.

Additionally, if one of the controlling systems should fail, often the buildings resources are either locked or unlocked at the wrong times. With the portals controlled by multiple entities, the problem requires diagnostics to pinpoint the trouble source. Even knowing the source of the problem, multiple vendors must frequently be coordinated to resolve the problem. The diagnostic procedure and subsequent vendor coordination slows the repair process when compared to a single portal, single vendor solution.

If the tenant and the management can agree upon a specific credential technology, then building management can update their database of valid access credentials based on a database extraction of the tenant's system. The issue of choosing a specific credential technology has been eased by the introduction of credential readers capable of reading multiple technologies. An example of a multi-technology credential reader is disclosed by U.S. patent application Ser. No. 11/470,660, Andresky, et al., "Synchronization Techniques In Multi-Technology/Multi-Frequency RFID Reader Arrays," page 1 paragraph [0011], and embodied by the HID Model RP40 multiCLASS Reader 6125. See, for example, http://www.hidglobal.com-/documents/rp15_rp40_rpk40_ds_en.pdf.

An example implementation of this technique was demonstrated by George Mallard's article "Future of access control tied to integration" in Access Control Magazine volume 34, number 10, September 1991, page one. This technique works well and addresses the aesthetic and service problems of multiple credential readers at the building portals. This technique partially addresses the "stale" database problems because the download and processing cycles are typically a batch process. The typical system has the batch run once a day, first by the tenant, then by the property management. Tenant credential changes done after their batch wait a full day before becoming active in the building's system.

However, maintenance of the database transfer can be problematic and requires customization of both the tenant's and the building management's access control systems software to accommodate the extraction and importing of each tenant's authorized credential list. Finally, many companies are reluctant to share a list of their credential holders with outside entities.

The Federal Government has addressed this same problem of authentication of credentials where several agencies need access to a shared portal. Its method of cross agency authentication is documented by the Backend Authentication Work Group prepared for the Federal Smart Card Interagency Advisory Board (IAB), "Framework for Interagency Authentication of Federal Personal ID Tenant Verification (PIV) Cards," August 2006, see: http://www.idmanagement.gov/iab/documents/FrameworkInteragencyAuthenicationFederalPIV.pdf.

This method defines a protocol where one agency can query another agency's security database over a network. Where this method addresses the problem of multiple tenant authentications, it does require each tenant to expose its security database on a common network and all entities to conform to a standard protocol. On page seven of the report, the authors note that "A secure means of transporting these messages must be devised." Further, on page 12, the authors state "The most important aspect of this security (since the message payload will be encrypted) is that a gateway can trust that the message was sent by another trusted gateway." The Federal Government has the resources to implement the security required by this technique.

However, in a commercial environment, cost is a factor. Therefore, as is known to those skilled in the art, the cohabitation of databases on a common network both opens the possibility of unauthorized access to sensitive information and is expensive to implement and maintain. The standard protocol for exchange of information may not be supported by all tenants, and therefore requires expensive modifications to their access control systems. These factors make the common protocol choice unattractive for commercial users.

Further, multi-tenant control systems face a plethora of data encoding and access control options. In a typical prior art system, the credential reader communicates the alphanumeric code read from the individual's credentials to a control panel utilizing serial data, clock plus data, F/2F, or the Weigand interface well known to those skilled in the art. Serial data is sent using an interface standard such as defined by the RS485, RS232, RS422, F/2F, or other standard. The Weigand interface was defined by Sensor Engineering in the early 1980's and is documented in the HID application note AN004.DOC prepared by Eric Sprik Sep. 21, 1998 page 9, see www.hidglobal.-com/documents/0004_an_en.pdf. Also, the 2005 HID document "Understanding Card Data Formats" http://www.hidglobal.com/documents/-understandCardDataFormats_wp_en.pdf documents the Weigand message structure.

Tech Tip #5 within Mr. Sprik's AN004.DOC page 11 discusses the structure of a common indicia coding. A coding example is shown in FIG. 3A and FIG. 3B. A credential with an indicium facility code of 159 and a personal identification number of 2199 is illustrated in both figures. This coding has 26 binary digits, or bits, formed from the two parity bits 301, 304, the eight facility code bits 302, and the sixteen personal identification number bits 303.

Error checking is illustrated in FIG. 3A. The first parity bit 301, is set so that the count of bits with a value of 1 in the combined set of the first parity bit 301, and the first twelve significant bits 307 is an even number, in this case six. This scheme is known as "even parity".

The second parity bit 304, is set so that the count of bits with a value of 1 in the combined set of the second parity bit 304, and the last twelve significant bits 306 is an odd number, in this case seven. This scheme is known as "odd parity". Parity is used to insure the coding was correctly read from the credential.

The structure of the indicia coding is illustrated in FIG. 3B. The eight bits used for the facility code 302 defines a set of two hundred and fifty-six unique facility codes. The facility code 302 shown is 159. The sixteen bits of the personal identification number 303, defines a set of sixty five thousand, five hundred and thirty-six unique personal identification numbers. The personal identification number 303 shown is 2199.

A tenant's facility code distinguishes its credentials from those belonging to other tenants, much like telephone numbers. A person in Houston could have the same seven digit phone number as someone in New York. But different area codes make these phone numbers unique.

In the same manner, a twenty six bit credential from tenant A may have the same personal identification number as someone from tenant B. The facility codes make the credentials unique. However, because this twenty-six bit coding scheme was devised by Sensor Engineering in the late 1970's, the success of access control equipment has outdated the twenty-six bit coding scheme.

Schemes with many more bits, both for the facility code and the personal identification number, have been devised. These methods allow the manufacturer to enter into agreements that allow entities to "own" their facility codes. This practice is documented in the 2005 HID white paper "Understanding the Corporate 1000" page 1, http://www.hidglobal-.com/documents/understandingCorp1000_wp_en.pdf. Some of these newer schemes have more parity bits and/or error checking and correction bits, as known to those skilled in the art. Essentially, any of the techniques used for error checking and/or correction in serial data transmission can be employed for the credential indicia, for example Cyclic Redundancy Checking.

Other schemes for dividing the indicia coding have been devised. One example divides the indicia into facility, site, and card number as documented in the 2005 HID white paper "How an HID Card is Read" page 2 http://www.hidglobal-.com-/documents/howHIDcardIsRead_wp_en.pdf.

Access control systems also face varying requirements for access security. For example, elevators are a portal through which tenants pass to access their private spaces. Security methods have been devised to limit use to preauthorized sets of floors. One method simply treats the ground lobby "Hall Call" button that summons an elevator to the floor as a control point. A card reader is associated with the button preventing its use without an authorized credential. Elevators frequently service more than one tenant. This method does not prevent one tenant from accessing another tenant's floor serviced by that same elevator.

A better method for implementing securing elevators is to view them as a partitioned resource, each floor being a partition element. The addition of access control system relays, one for each floor select button, implements the partitioning system. When inactive, the associated floor select button is unresponsive. Upon reception of an authorized indicium, the access control system activates the set of relays corresponding to the floors authorized for that credential. This allows the credential holder to register his request to the elevator control machinery by pressing one of the now responsive floor select buttons. Pressing a floor selection associated with an inactive button will not register with the elevator control machinery.

Referring to FIGS. 2A-2C, a prior art control system is illustrated. A credential holder 200 approaches resource portal 209 and presents his credentials to credential reader 201. The electrically encoded identification is transmitted to control panel 202 via processor connection 106. The control panel 202 then formats this identification into a message and transmits it to the monitoring computer 204 via first, second, and third communication lines 203, 215, and 216. This message is received by the monitoring computer 204 which processes the message. The monitoring computer 204 consults a database of authorized users returning a message that authorizes access to the appropriate portions of the resource. The resource partitioning panel 208 receives the message from first and second communication lines 203 and 215 and via cables 105, activating appropriate relays (211a through 211n of FIG. 2C) within resource partitioning panel 208. Each of relays 211a through 211n corresponds to a partition of the resource. In the example of an elevator control system, the resource partitions correspond to floors. A floor selection will only be registered as a floor call by the elevator machinery if the associated relay is active.

The resource selection panel 214 is illustrated in FIG. 2B for an elevator. The floor select buttons (210a through 210n) are mounted on the resource selection panel 214. Credential holder 200 closes the desired electrical contact (one of 210a through 210n) by pressing the respective button.

The resource partitioning panel 208 circuitry is illustrated controlling access to the resource, elevator floor selections. The floor select buttons (210a through 210n) are normally open pushbuttons. The partitioning relays (211a through 211n) normally open contacts are wired in series with the floor select buttons (210a though 210n).

The elevator machinery control 212 registers a closure on the floor select inputs (213a through 213n) as a floor call. It responds by delivering the credential holder 200 to the corresponding floor. When secure, closure of the floor select button (210a through 210n) is not "seen" by the elevator machinery floor select inputs (213a through 213n), because the circuit is open at the inactive relays (211a through 211n). Thus, the resource partitioning panel 208 prevents floor requests from being registered.

When the credential holder 200 presents a valid credential to the credential reader 201, the access system responds by activating only those relays (211a through 211n) corresponding to the subset of floors the credential holder is authorized to access. The selected relays (211a through 211n) are active for the period of time deemed sufficient for the credential holder 200 to make his selection. The relays (211a through 211n) outside of the subset are not active. Thus, the floor select buttons not included in the subset are not responsive.

Some of the newer elevator machinery controls provide specific partitioning relay inputs. Software within the elevator machinery controls effectively places the relays (211a through 211n) in series with the floor selection buttons (210a though 210n). Other circuitry required to provide life safety and other functionality has been omitted for clarity. The fire alarm interface is an example of the omitted circuitry.

The number of floor select buttons in high rise elevators frequently exceeds the relay capacity of common access control panels. Often, the resource partitioning panel 208 is implemented as an independent controller. The Optomux controller, manufactured by Opto22 of Temecula, Calif., has the capacity for an array of up to sixteen relays. (See, for example, http://www.opto22.com/documents/1546_E1-_E2_brainboard_datasheet.pdf.) Should an elevator require more than sixteen control relays, multiple Optomux panels may be grouped implementing a larger resource partitioning panel 208.

A string of ASCII characters controls the Optomux. Received from an RS-485 or ethernet circuit, the string indicates which relays are to be active and for how long. When an indicium is presented to the credential reader 201, the monitoring computer 204 responds with a string appropriate for that credential. This string is directed to the resource partitioning panel 208. The resource partitioning panel 208 activates the predefined subset of floor select relays (a subset of 211a through 211n), as directed by the aforementioned string. Only then is the credential holder 200 free to make his floor selection. Because only the predefined set of floor selection buttons is active, the credential holder selection is limited to that set. After a short period of time, a typical value being 15 seconds, the floor select relays (211a through 211n) are deactivated, securing the floor select buttons.

Other prior art systems do not provide the functionality of the present invention. For example, U.S. Pat. No. 4,644,484 to Flynn, et al., "Stand-alone access control system clock control," at column 2 lines 38-41 discloses that a cardholder database can be incorporated within the control panel 202. By extension, the cardholder's authorized resource partition control strings are also included in some control panels.

The Laredo interface, as produced by KMS Systems, Inc., which was demonstrated to the public at TechSec in Dallas February 2007, incorporated certain features of this invention. However, the Laredo system presented did not incorporate the "Virtual Card Read" described below.

Further the present invention differs from U.S. patent application Ser. No. 12/274,799 ("the '799 application"), "System for Integrating Multiple Access Control Systems," because the invention described in the '799 application operates independently of the legacy building management access control system. The present invention also differs from pending U.S. patent application Ser. No. 12/317,684 ("the '684 application), "System for Integrating a Plurality of Access Control Systems having Partitionable Resources," because the '684 application replaces the legacy building management access control system. The present invention interfaces with both legacy building management access control systems and tenant access control systems.

U.S. Pat. No. 7,644,299 to Kosaka discloses a system using a plurality of redundant master controllers with a single database. This single database is copied to a group of master controllers to provide a seamless failure protection system. This application integrates a plurality of separate entities that do not have the same set of authentication indicia.

Kosaka employs multiple communication ports utilizes peer to peer network communications. Further, Kosaka discloses a full communication channel between devices. Thus, Kosaka has the disadvantages associated with shared databases that are avoided by the present invention. The present invention isolates the tenants' databases by means of card reader interfaces which allow only indicia numbers and binary responses to flow between the base building system and the tenant systems.

Additionally, the system published United States Patent Application No. 20040172309 (Selwanes, et al.) alerts the card holder if his card has an indicium not found in the database. That system responds to this condition with an exception message to the input device, which in turn alerts the card holder. In contrast, the present invention has no response to indicia not found in the database.

Further, Selwanes provides a full communication channel between devices owned by separate entities (e.g., tenants), again having the disadvantages associated with shared databases. The present invention isolates the tenants' databases by means of card reader interfaces which allow only indicia numbers and binary responses to flow between the base building system and the tenant systems.

A method to extend credential reader signals point to point over a network is illustrated by the Cypress Computer Systems, Inc. dual reader extender model DPX-7200 http://www.cypressworld.com/CD/PDF/cutsheet/DPXCutSheet.pdf. As described on page one of the Cypress Computer System user manual, http://www.-cypressworld.com/CD/PDF/Duprex/DPX-7200.pdithe 7200 series is a paired central and remote point to point network devices. The Nov. 18, 2004 setup document http://cypressworld.com/271101/CD/Duprex/Ethernet/AN-SY-DPX-7200-1_v100.pdf further illustrates this with the central device's IP address requiring the remote device's IP to be entered in the setup, page 8. Similarly, the remote device's IP is required when setting up the central device. In contrast to a point to point system, the invention described herein is a multipoint network system.

The Wiegand to RS485 Converter W2RS485 manufactured by ETConcept Engineering described at http://www.et-concept.com/images/ETConcept/products/security/interface/w2rs485/W2RS485%20Brief%20User's%20Guide%20EN%20v1.pdf offers another device that extends credential reader signals point to point utilizing RS485 circuitry. It does not offer the features of either multipoint networking or the Virtual Card Read described below.

The DataBender™ series of manufactured by Cypress Computer Systems, Inc. mutates a credential indicium from one bit structure and/or electrical format to another, preserving the indicium personal identification number as best it can. The CVX-1201 (http://cypressworld.com/271101/CD/Converter/SS-CVX-1201_v105.pdf page 5) and the CVX-1200 (http://cypressworld.com/271101/CD/Converter/SS-CVX-1200_v118.pdf page 5) offer test modes where predefined indicia are output. However, the DataBender™ output is not under the control of an external input. Instead, it simply reformats the input indicium into the same indicium represented in a different format. The DataBender™ output is not a network message routed to the originating panel from a plurality of potential panels. Nor can the DataBender™ test indicium output be adjusted.

In contrast, the invention described herein uses an external contact's active state to control the generation of a predefined pseudo-credential message within a sequential framework of outputting the original credential and waiting for a response within a certain time frame. That pseudo-credential message is reflected back into the originating panel from one or more possible originating panels. The pseudo-credential message, in certain cases, retains the Facility Code of the original indicium.

The present invention also differs from a distributed database system, as disclosed by U.S. Pat. No. 5,721,909 ("the '909 patent") to Oulid-Aissa, et al., "Distributed Database Architecture and Distributed Database Management System for Open Network Evolution," at column 1 lines 32-40. Specifically, this invention is not a distributed database system.

Because, in the present invention, each tenant manages its own list of credentials, the system is a collection of independently managed files. No relationship or linkage exists between the entities' lists of credential holders. Thus, the system of the present invention does not present a true database. Further, there is no mechanism or administrator feature that would allow a single tenant to manage all the access control system's databases. Therefore, the present invention is not a true database management system.

SUMMARY OF THE INVENTION

The present invention addresses the problems outlined above by having a network enhanced reader processor read an access control indicium and then repeating the indicium to the tenants' proprietary access control systems. A Pseudo-Reader is employed to generate impulses compatible with the tenants' proprietary system access control inputs. The system then waits for the proprietary system to either grant or deny the access control indicium.

The "pseudo-reader" relays this decision to a network enhanced reader processor by use of a "Virtual Card Read." The second "pseudo-reader" injects a virtual card read into the building's access control system. Control of the portal or resource is then defined by the pseudo-indicium privileges granted by the legacy building access control administrator. The virtual card read indicium is predefined by the legacy building access control administrator for each "pseudo-reader."

As those of skill in the art will understand, the "Virtual Card Read" technique works as well to control a portal as it does to control a partitioned resource. A major advantage for the legacy building access control administrator is that an entire tenant's credential holder list can be administered as a single indicium, the pseudo-credential. Additionally, histories of tenant employee movement can be compiled using the existing legacy building access control system.

The invention compartmentalizes security by providing each device in the system with just enough information and privileges to decide whether an access control indicium is allowed entry. The invention does not require exposure of a tenant's entire database, either by transfer to a third party or on a conventional network. The access control indicium is presented as a credential read at the tenant's interface. Thus, the only input operation possible from building's system to the tenant's system is the transmission of a access control indicium. The only information returned from the tenant is the access control indicium's validity for a particular portal or building resource. The scope of these two operations is enforced by the tenant's access control system hardware. Thus, the tenant's database is shielded from wholesale attack and possible compromise.

The invention allows the tenants to authorize access to their individuals within the framework of their ordinary internal processes. The invention does not require extensive modifications of existing systems. Changes in the tenant's list of authorized users are implemented immediately within the building's system. Thus, the invention avoids the lag time normally associated with having to notify the building access administrator of each change, and to have each change implemented on the building's system.

The network enhanced reader processor provides the access control indicium to one or more Pseudo-Reader panels. Thus, a single access control input can be tested by number of tenants. Also, a single Pseudo-Reader panel can service a number of resource portals controlled by network access control panels. Thus, network Pseudo-Reader panels and network access control panels form a network web which can service one or more resource portals from one or more tenants.

BRIEF DESCRIPTION OF THE DRAWINGS

FIG. 2A is a schematic drawing showing interconnectivity of a prior art security system.

FIG. 2B is a schematic drawing illustrating a prior art user selection interface.

FIG. 2C is a schematic drawing showing electrical control logic in a prior art access control system.

FIG. 3A is a schematic drawing illustrating prior art error checking in encoded access systems.

FIG. 3B is a schematic drawing illustrating prior art encoding of facility and personal identification codes.

FIG. 4B is a data-flow diagram for one embodiment of the present invention during evaluation of an access control indicium by a tenant's access control system.

DETAILED DESCRIPTION

Figure 1:
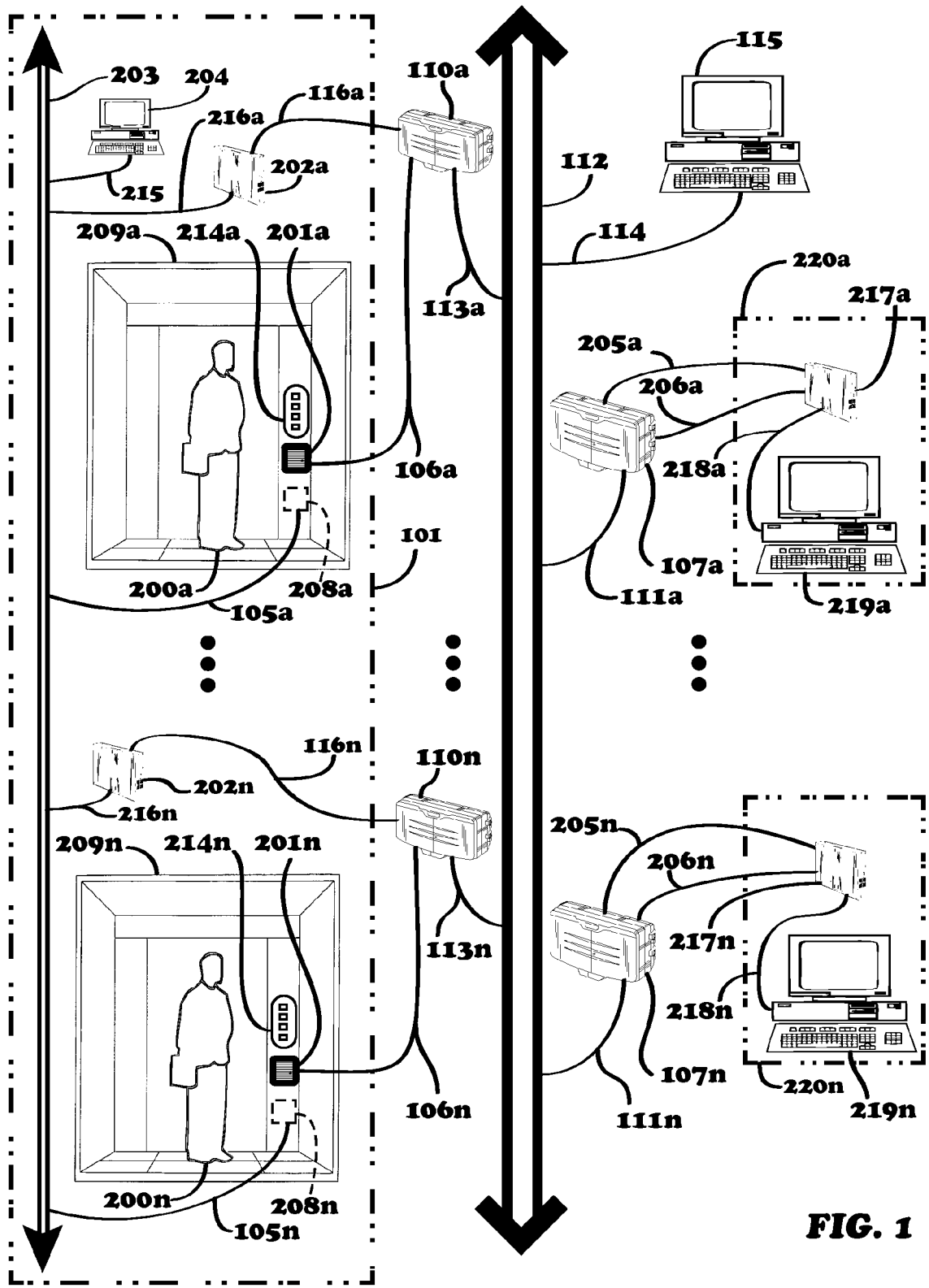
FIG. 1 is a schematic drawing showing interconnectivity of one embodiment of the present invention.

Referring to FIG. 1, access to the resources is controlled at resource portals 209a through 209n by legacy resource partitioning panels 208a through 208n, which in turn are controlled by the respective legacy control panels (202a through 202n). The partitioning panels (208a through 208n) are connected to the legacy communications circuit 203 via cables (105a through 105n). The resource selection panels 214a through 214n are used by the credential holder (200a through 200n) to make his selection. Credential readers (201a through 201n) are connected to the respective network enabled reader processors (110a through 110n) via processor connections (106a through 106n). The network enabled reader processors (110a through 110n) are connected to the network (112) by first network cables (113a through 113n). Pseudo-Reader panels (107a through 107n) are connected to the network 112 by cables (111a through 111n). The Pseudo-Reader panels (107a through 107n) are connected to the tenant's legacy access control panels (217a through 217n) reader interface by first panel connections (206a through 206n).

The tenant legacy access control systems (220a through 220n) at the legacy access control panels (217a through 217n), which are typically used to control locking devices, are connected to the Pseudo-Reader panels (107a through 107n) by respective second panel connections (205a through 205n) and first panel connections (206a through 206n). The tenant's legacy access control panels (217a through 217n) connect to their respective database computer systems (219a through 219n) by computer cables (218a through 218n).

The legacy building access control system 101 is provided to implement a standard access control system for credentials issued by the property management. The monitoring computer 204 provides the functions of credential management, historical entry logging and alerting monitoring personnel. It is connected to the first communications line 203 via second communication line 215.

The monitoring computer 204 houses a database that generates signals controlling the resource partitioning panels (208a through 208n) based on the privileges granted to a received indicium. Upon receiving a message indicating a credential holder 200 is requesting access to the resource, the monitoring computer 204 responds with the necessary signals to release the restrictions on the appropriate resource partitions.

In one embodiment of the invention, a credential holder 200a approaches a resource portal 209a and requests access by presenting his credentials to a credential reader 201a. The credential reader 201a reads the credential and translates it into an electrically encoded indicium. The indicium is transmitted to the network enabled reader processor 110a via processor connection 106a. The network enabled reader processor 110a formats this indicium into a network message and places it on the network 112 via first network cable 113a. This message is received by one or more Pseudo-Reader panels (107a through 107n) via second network cables (111a through 111n). Building issued and other credentials may be chosen on the basis of predefined criteria to be transmitted to the control panel (202a through 202n) via control panel connections (116a through 116n). The legacy building control panels (202a through 202n) communicate the received indicium via first, second, and third communications lines, 203, 215, and (216a through 216n) to the legacy building monitoring computer 204.

The Pseudo-Reader panels (107a through 107n) examine the indicium. If predefined criteria are met, the Pseudo-Reader panel generates either a Weigand pulse stream or serial data stream which reflects the electrically encoded identification as it would be generated by an actual credential reader. This identification data stream is directed into the tenant's legacy access control system (220a through 220n) via first panel connections (206a through 206n). The tenant's legacy access control system will then vet the credentials by ordinary means as described in the prior art and indicate an authorized user by activating an electrical contact within in a control panel. (217a through 217n). These electrical contacts are typically used for controlling a door lock. However, in the present invention the electrical contacts are monitored by Pseudo-Reader panels (107a through 107n) via second panel connections (205a through 205n).

If indicated by the electrical contact, a "Virtual Card Read" is generated and transmitted to the originating network enabled reader processor (110a through 110n). The "Virtual Card Read" will contain a credential indicium of a credential predefined by the legacy building access control system administrator. That "Virtual Card Read" credential will be granted access to all the levels, portals, and privileges granted the associated tenant by the legacy building system administrator. Thus, all the authorized credentials associated with that tenant are translated into the pseudo-indicium.

An alternative embodiment of this invention replaces the individual's personal identification number (see, for example, FIG. 3B, 303) with a predefined number, preserving the facility code bits 302. The facility code bits 302 and the predefined personal identification number is sent as the pseudo-indicium for the presented credential.

When the originating network enabled reader processor (110a through 110n) receives the "Virtual Card Read" message, it transmits the "Virtual Card Read" indicium to the legacy building access control panel (202a through 202n)

which in turn processes it as if a credential with that indicium had been presented at the panel's credential reader. The "Virtual Card Read" indicium is processed by the legacy building access control system 101 and the credential holder 200 is allowed to select his destination from the set predefined for that tenant. In the case of environmental controls, the credential holder 200 may be allowed (or allowed to select) after-hours air conditioning and/or lighting. In the case of a portal, the credential holder 200 is allowed or disallowed access.

An alternative embodiment provides an audit computer 115 connected to the network 112 via audit computer cable 114 for audit, maintenance, and diagnostic functions of this invention's activities. It should be noted that the functions of audit, history logging, and alerts may be divided among a plurality of such audit computers 115.

Figure 4A:
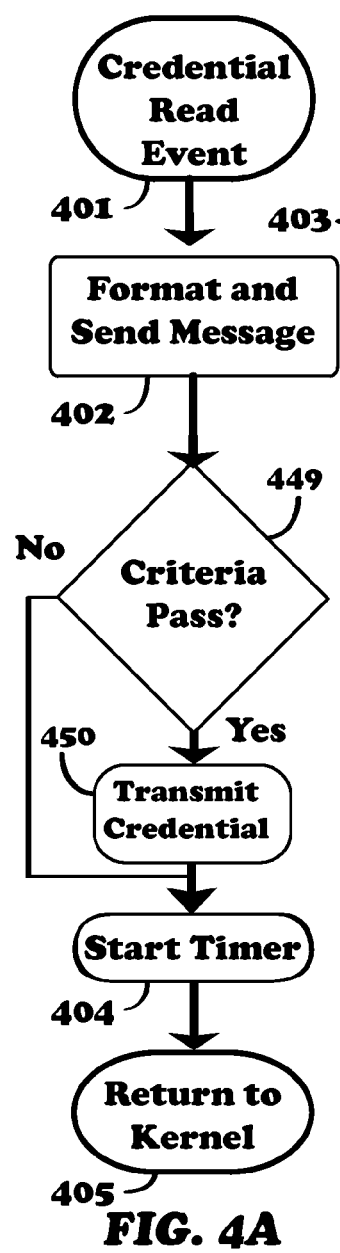
FIG. 4A is a data-flow diagram for one embodiment of the present invention during the initial receipt of an access control indicium.
Figure 4C:
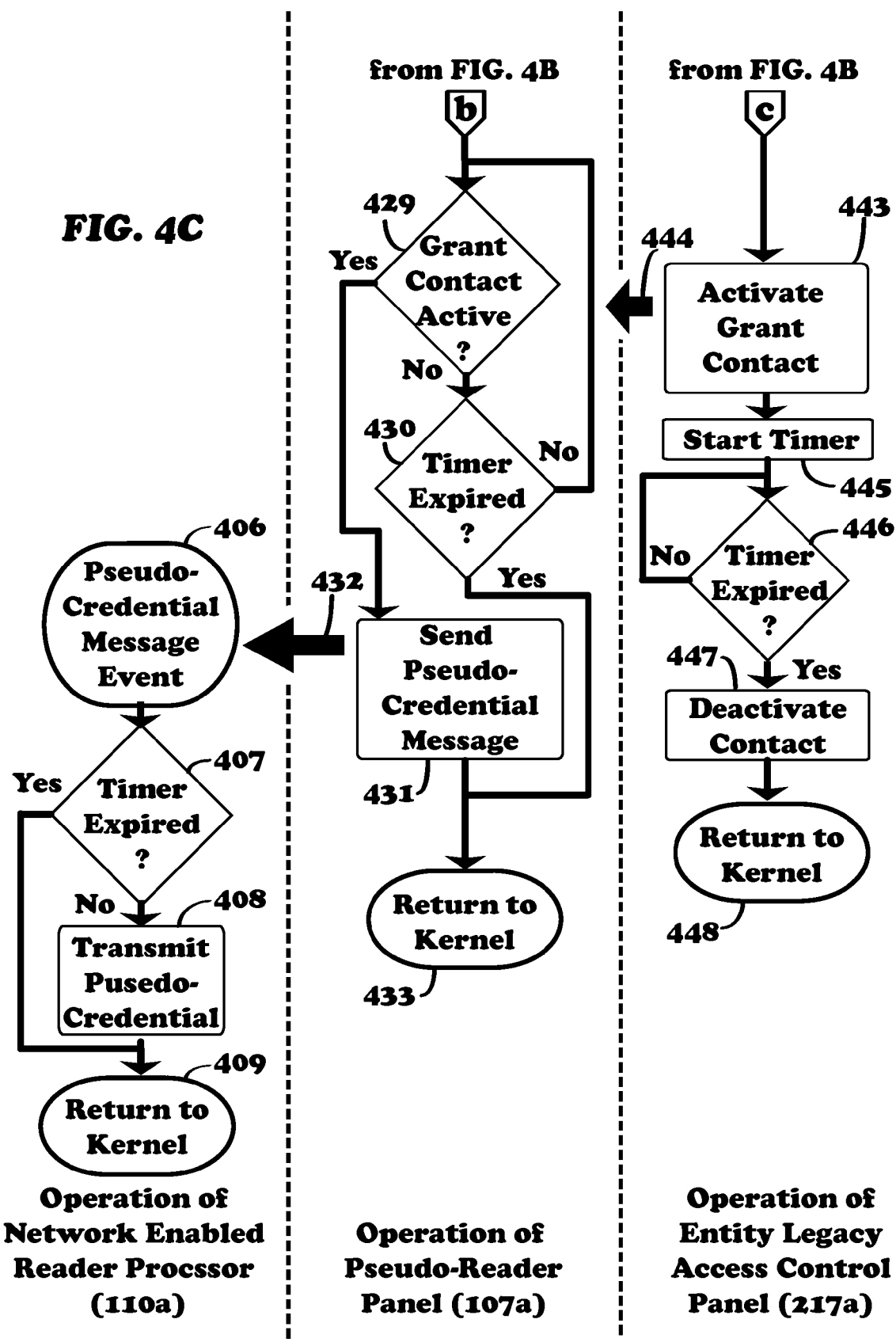
FIG. 4C is a data-flow diagram for one embodiment of the present invention during a period when access has been allowed.

The simplified flowchart of FIGS. 4A, 4B and 4C show the interaction between three elements to grant a credential access to a resource portal (209a through 209n) from the legacy building access control system 101. Those three elements are the network enabled reader processors (110a through 110n), the Pseudo-Reader panels (107a through 107n), and the tenants' legacy access control systems (220a through 220n).

Those of skill in the art will recognize that modifications to the steps reflected in FIGS. 4A, 4B and 4C may be necessary depending on the internal programming of the respective legacy building access control system 101 and the tenants' access control systems (220a through 220n). The flowchart also does not consider a scheme in which the tenants' legacy access control panels (217a through 217n) presents a "Deny" or "Handicap" relay contact to a Pseudo-Reader panel (107a through 107n). Instead, the Pseudo-Reader panel's (107a through 107n) grant timer will expire waiting for a grant indication from the legacy access control panel (217a through 217n) if the credential is not valid.

Figure 5:
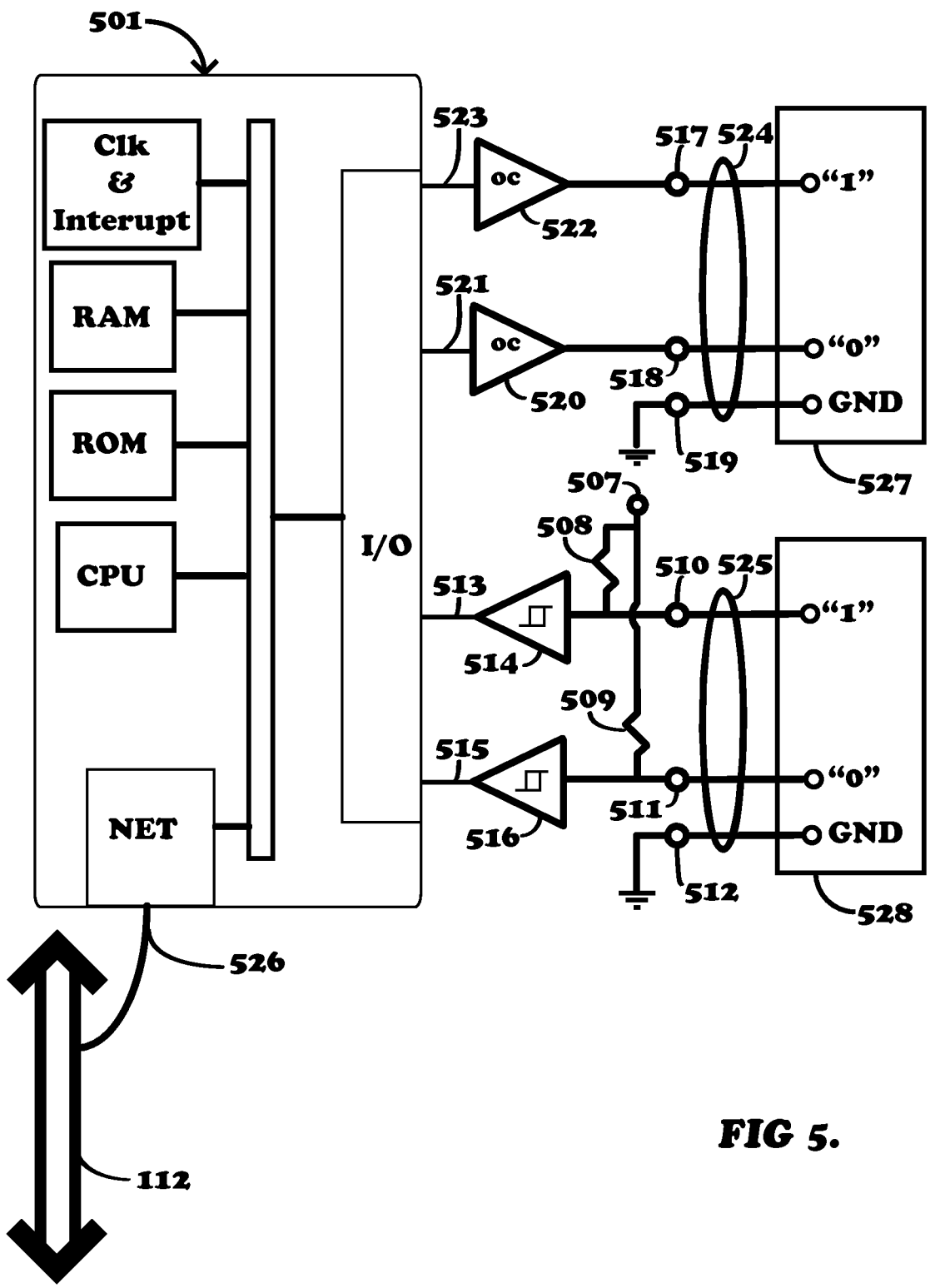
FIG. 5 is a schematic diagram for a network enabled access control panel.

Referring now also to FIG. 5, a reader network processor 501 is incorporated into each of the network enabled reader processors (110a through 110n) and has kernel software typically provided by the network processor manufacturer. Network maintenance and other housekeeping tasks are typically performed by the kernel software. Message processing is an interrupt response routine which is called from the kernel software. When a credential is read at a credential reader (201a through 201n), the network enabled reader processor (110a through 110n) kernel software interrupts what it was doing and calls the procedure starting at Credential Read Event (401 of FIG. 4A). When a pseudo-credential message is received from the network 112, the reader network processor 501 kernel software calls the message processing procedure, which starts at Pseudo Credential Message Event (406 of FIG. 4C). Ping requests, Arp requests and other network housekeeping functions are handled by the reader network processor's 501 kernel software and are not typically forwarded to message handling interrupt procedures.

In one embodiment of this invention, a single reader network processor 501 may serve a plurality of resource portals 209 and credential readers 201 if equipped with a suitable number of inputs and outputs.

Referring again to FIGS. 4A, 4B, and 4C, an indicium message 403 is sent out on the network for the Pseudo-Reader panels (107a through 107n) to receive. The indicium is then tested 422 and if the predefined criteria are met the indicium is transmitted 427 to the entity legacy access control panel (217a through 217n).

After testing and optionally transmitting the indicium a reader processor transaction timer 404 is started and control of the reader network processor 501 is passed back to the kernel software in reader Return to Kernel 405.

Figure 6:
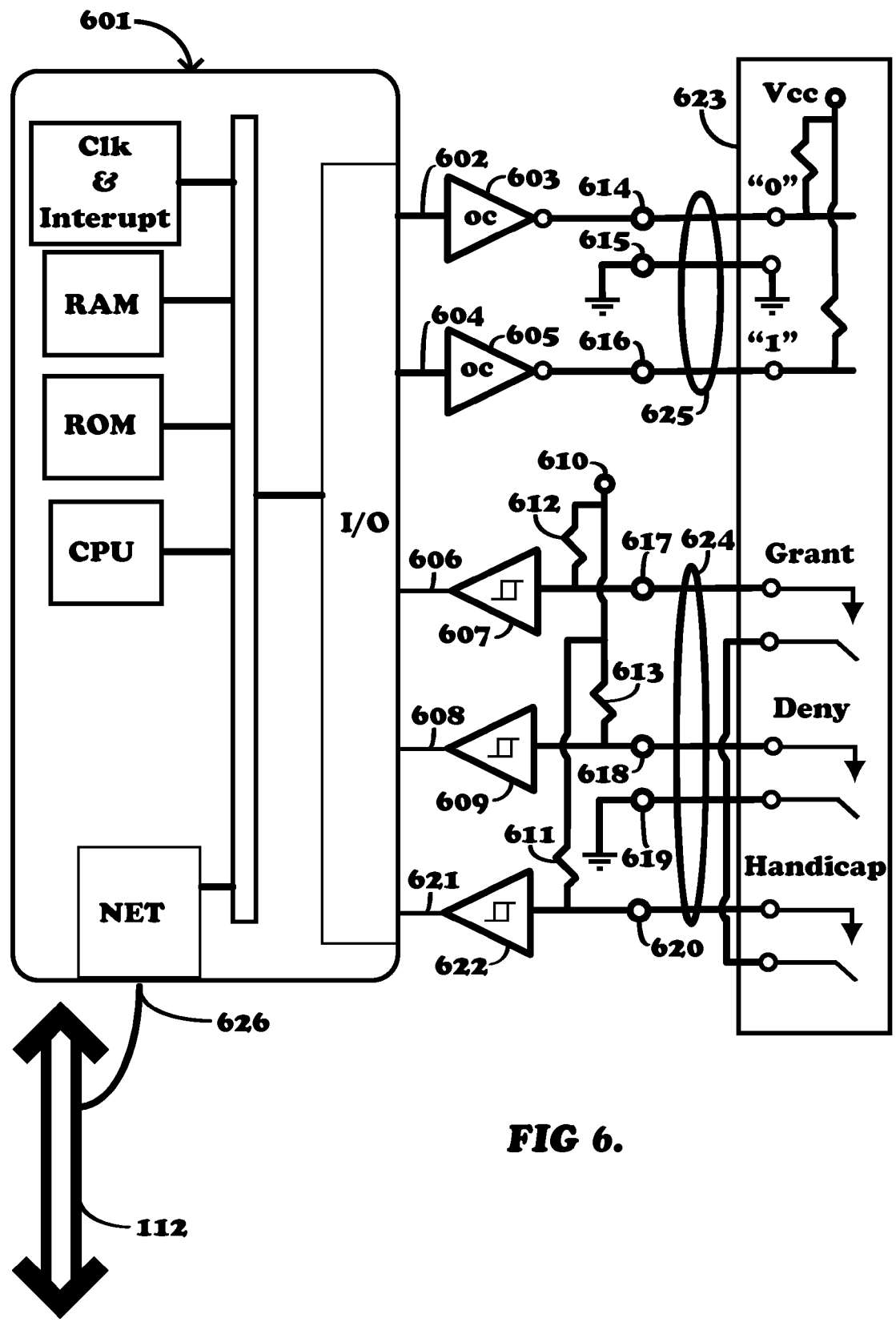
FIG. 6 is a schematic diagram for a pseudo-reader panel for an embodiment of the present invention.

Referring also to FIGS. 1 and 6, the Pseudo-Readers panels (107a through 107n) each have a pseudo reader network processor 601. The pseudo reader network processor 601 incorporates kernel software which performs network maintenance and other housekeeping tasks. When a message is received from the network 112, the pseudo reader network processor 601 kernel software calls the message processing procedure starting at Credential Message Event 420. The credential is processed and control is passed back to the kernel software in first pseudo-reader Return to Kernel 423 or second pseudo-reader Return to Kernel 433. Ping requests, Arp requests and other network maintenance functions are handled by the pseudo reader network processor's 601 kernel software and are not typically forwarded to message handling interrupt procedures.

In one embodiment of this invention, a single pseudo reader network processor 601 can serve a plurality of tenant reader panels if equipped with a suitable number of inputs and outputs.

Referring again to FIGS. 4A, 4B, and 4C, four examples are provided to illustrate overall process flow. As is known to those skilled in the art, the criteria test can incorporate an anti-fraud measure by rejecting any situations in which the original credential indicium matches any of the allowable virtual indicia. Additionally the criteria test could be any arithmetic test of the indicium against a standard including testing for the number of bits in the indicium, and the following examples are not limiting of the manner in which an indicium may be tested. The first example illustrates denial because a Facility Code is not valid. The second example illustrates denial because the personal identification number is not valid for the tenant. The third example illustrates a valid credential and the granting of access. The fourth example is that of a building issued credential.

EXAMPLE 1

Invalid Facility Code

When a credential is read, the network enabled reader processor (110a though 110n) kernel software passes control to Credential Read Event 401, transmits the indicium message 403 in the Format and Send Message step 402. The indicium is then tested 449 and if the predefined criteria is met the "YES" branch is taken and the indicium is transmitted 450 to the building management legacy access control panel (202a through 202n). If the predefined criteria is not met the "NO" branch is taken. After testing and optionally transmitting the indicium the network enabled reader processor (110a through 110n) starts the reader processor transaction timer 404. Finally, control is returned to the kernel software in reader processor Return to Kernel 405.

The Pseudo-Reader panel (107a through 107n) kernel software passes control to Credential Message Event 420 upon reception of the indicium message 403, then Extract Indicia 421 processes the message testing against predefined criteria. The Criteria Pass 422 "No" branch is taken because the facility code is invalid. Control is returned to the kernel software in first pseudo-reader Return to Kernel 423. In one embodiment of this invention, before the first pseudo-reader Return to Kernel 423 event occurs, a message indicating a criteria match failure may be transmitted over the network 112 by the Pseudo-Reader panel.

EXAMPLE 2

Credential Invalid for a Tenant

When a credential is read, the network enabled reader processor (110a through 110n) kernel software passes control to Credential Read Event 401, transmits the indicium message 403 in Format and Transmit Message 402. The indicium is then tested 449 and if the predefined criteria is met the "YES" branch is taken and the indicium is transmitted 450 to the building management legacy access control panel (202a through 202n). If the predefined criteria is not met the "NO" branch is taken. After testing and optionally transmitting the indicium the network enabled reader processor (110a through 110n) starts the reader processor transaction timer 404. Finally, control is returned to the kernel software in reader Return to Kernel 405.

The Pseudo-Reader panel's (107a through 107n) kernel software passes control to Credential Message Event 420 upon reception of the indicium message 403, then Extract Indicia 421 processes the message to test it against predefined criteria. The next step tests the Criteria Pass 422. This credential passes the test and control flows via the "Yes" branch to test if the Grant Contact is Active 424.

If the grant contact is active, then Grant Contact Active 424 "Yes" branch is taken and control returns to the kernel at third pseudo-reader return to kernel 425. This action prevents an tenant from granting a credential that was read immediately after another credential was granted, but before the tenant's panel has reached the tenant panel first Return to Kernel 448 for that previous credential processing.

An alternative implementation of the "granting procedure," would be another interrupt driven procedure where the interrupt is driven by the contact going active, otherwise known as edge triggering. As the pseudo reader network processor 601 waits for the contact to move from the inactive to the active state, the test of the Grant Contact Active 424 is not needed.

The Grant Contact Active 424 "No" branch leads to Transmit Pseudo Credential 426. The grant timer is started 428, the tenant's legacy access control panel grant contacts are tested 429, and the grant timer is tested 430. If neither the contacts test active 429, nor the timer has expired 430, then the Pseudo-Reader panel loops again, testing both the contacts 429 and the timer 430. In this case, the timer expires 430 because the example credential is not valid for the tenant's legacy access control panel (217a through 217n).

The credential message 427 passes the credential indicium to the tenant's legacy access control panel (217a through 217n). Upon receiving the credential indicium, the tenant's kernel software responds by calling the tenant's Credential Read Event 440. The credential is vetted in Valid Credential 441, just as it would from a directly attached credential reader. Because the credential is not valid, the "No" branch is taken and control returns to the kernel software via tenant panel second Return to Kernel 442.

After the grant timer expires in the Pseudo-Reader panel (107a through 107n), control is passed back to the kernel software via the "Yes" branch of Timer Expired 430, then second pseudo-reader Return to Kernel 433. As is known to those skilled in the art, it would be possible to add a Deny or Timer Expired message transmission into the "Yes" branch of Timer Expired 430 before the second pseudo-reader Return to Kernel 433.

EXAMPLE 3

Valid Credential

When a credential is read, the network enabled reader processor (110a through 110n) kernel software passes control to Credential Read Event 401, transmits the indicium message 403 in Format and Transmit Message 402. The indicium is then tested 449 and if the predefined criteria is met the "YES" branch is taken and the indicium is transmitted 450 to the legacy access control panel (202a through 202n). If the predefined criteria is not met the "NO" branch is taken. After testing and optionally transmitting the indicium to the building management legacy access control panel (202a through 202n) the network enabled reader processor (110a through 110n) starts the reader processor transaction timer 404. Finally, control is returned to the kernel software in reader Return to Kernel 405.

The Pseudo-Reader panel's (107a through 107n) kernel software passes control to Credential Message Event 420 upon reception of the indicium message 403. Extract Indicia 421 processes the message to extract the indicium. The next step tests the predefined criteria in Criteria Pass 422. This credential passes the test and control flows via the "Yes" branch to test Grant Contact Active 424. If the tenant's Grant Contacts are inactive, control flows out the "No" branch of Grant Contact Active 424 to Transmit Pseudo Credential 426 via credential message 427. The grant timer is started 428, the tenant's legacy access control panel Grant contacts are tested 429 and the grant timer is tested 430. If neither the contacts have become active 429, nor the timer has expired 430, the Pseudo-Reader panel loops again, testing both the contacts 429 and the timer 430.

The credential message 427 passes the credential indicium to the tenant's legacy access control panel (217a through 217n). Upon receiving the credential indicium, the tenant's kernel software responds by calling the tenant's Credential Read Event 440. The credential is vetted in Valid Credential 441, just as it would from a directly attached credential reader. Because this credential is valid, control passes out the "Yes" branch to Activates the Grant Contact 443. This action generates a grant condition 444 that the Pseudo-Reader panel (107a through 107n) can check indicating the credential indicium is valid. A contact timer is started in tenant Start Timer 445, and is tested in tenant Timer Expired 446. If the "No" branch is taken, the contact timer is tested again. If the timer has expired, the "Yes" branch is taken. The grant contact is deactivated in Deactivate Contact 447, and control is returned to the tenant's legacy access control panel kernel software in tenant panel first Return to Kernel 448.

As will be recognized by those skilled in the art, it would be possible to buffer the transmission of the credential indicium 427 until the grant contact goes inactive or a timer expires.

When the Pseudo-Reader panel (107a through 107n) tests the Grant Contact for Active 429 and control passes out the "Yes" branch, the step Send a Pseudo-Credential Message 431 is called sending a pseudo-credential message 432 to the originating network enabled reader processor (110a through 110n).

A pseudo-credential message 432 received by the network enabled reader processor (110a through 110n) causes the kernel software to pass control to Pseudo-Credential Message Event 406. The transaction timer started in reader processor Start Timer 404 is then tested in reader processor Timer Expired 407. If the transaction has not gone stale and is in fact the same indicium as used when the Start Timer 404 was last called, the transaction passes the timer and indicium match test and the "No" branch is taken.

Figure 7:
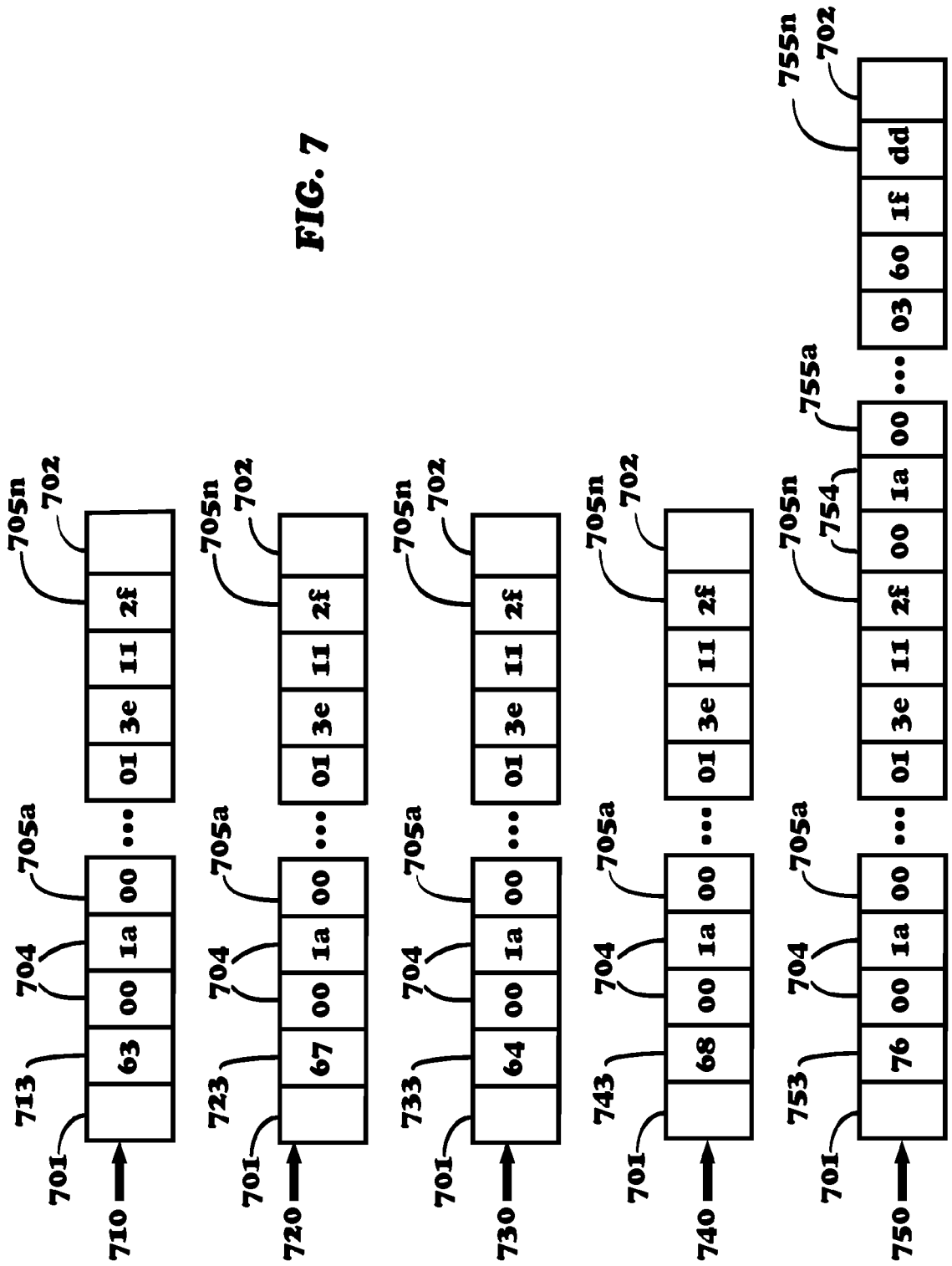
FIG. 7 is a schematic representation of network message encoding for an embodiment of the present invention.

Referring now also to FIG. 7, the network enabled reader processor (110a through 110n), extracts and processes 408 the pseudo-credential 754 and 755a through 755n) from the pseudo-credential message 750. The pseudo-credential is transmitted to the building management legacy access control panel (202a through 202n) and processed as if it had been read at the credential reader (201a through 201n). Control is returned back to the kernel software in the final step reader processor Return to Kernel 409. The pseudo-credential is processed as described above and as known in the prior art. The ultimate result is the legacy access system responds by activating the appropriate relays (211a through 211n). In accordance with the prior art, this action allows the credential holder to register his floor selections with the elevator control machinery 212.

So long as the credential is valid, as in this example, the same process may be used to allow access to billable resources, such as HVAC for one or more zones of the building.

EXAMPLE 4

Building Issued Credential

In this example, the credential is issued by the building and meets criteria test 449 yet does not meet the predefined criteria in test 422. When a credential is read, the network enabled reader processor (110a through 110n) kernel software passes control to Credential Read Event 401, transmits the indicium message 403 in Format and Send Message 402. The indicium is then tested 449 and if the predefined criteria is met the "YES" branch is taken and the indicium is transmitted 450 to the legacy building management access control panel (202a through 202n). After transmitting the indicium the network enabled reader processor (110a through 110n) starts the reader processor transaction timer 404. Finally, control is returned to the kernel software in reader processor Return to Kernel 405. As the indicium did not pass the predefined criteria in test 422 the transaction timer 404 expires. The credential is processed as described above in the prior art. The ultimate result is the legacy access system responds by activating the appropriate relays (211a through 211n). In accordance with the prior art, this action allows the credential holder to register his floor selections with the elevator control machinery 212.

The reader processor transaction timer 404 is coupled to the most recent credential reading and continues to run after control returns to the kernel. After the reader processor transaction timer 404 expires, any messages for that credential read are ignored. The credential indicium, in an embodiment of this invention, is used as a transaction identification as is illustrated in the message schematics shown in FIG. 7. Alternatively, a transaction number may be generated which couples the indicium, the timer, and/or a read time to the transaction messages.

Network routers and other interconnection devices might cause latencies or duplicated messages when certain network protocols are employed. A delayed or duplicated message could result in the resource being released again, some time after the credential holder 200 has left the portal area. This problem is addressed by having credential transactions expire after some adjustable time. The network enabled reader processor (110a through 110n) tests the transaction's freshness with reader processor Timer Expired 407. If the transaction has gone stale, the message is ignored.

The "Handicap" message is handled in a manner similar to the grant message. The "Handicap" message may uses a second pseudo-credential to better enable the legacy building access control system to accommodate the needs of the credential holder 200. The second "Handicap" credential has the "Handicap" attributes as defined by the building management legacy access control system administrator.

Optionally, a test for a deny contact closure between the grant contact testing 429 and timer testing 430 may be included. If the deny contact closure was detected, then an appropriate credential message would be transmitted and subsequent control would pass back to the kernel software 433. In a similar fashion, tests for the Handicap relay closure may be incorporated between grant contact testing 429 and timer testing 430. However, it may be advantageous to send an alternative pseudo-credential message 432 if both contacts within the tenant's legacy access control panel (202a through 202n) are closed.

Also, a Handicap credential message may be generated if the tenant's legacy access control system panel (202a through 202n) holds the grant contacts closed for a period that exceeds a predefined threshold. The Handicap credential would be processed by the legacy building access control system (110a through 110n) as determined by the legacy building system administrator. Typically, a handicap would be given more time to access the resource.

A denied credential message could be employed to alert the monitoring personnel of an unauthorized attempt to access the shared resource. This alert could come from either the legacy building system 101 or the optional audit computer 115. Some legacy systems allow a credential to be marked as "hot" which would alert the monitoring personnel to its use. The legacy system administrator could use this feature to mark the virtual credential used as the deny credential thereby alerting the monitoring personnel.

The Facility Code is used as a selector in an alternative embodiment. The network enabled reader processor (110a through 110n) would transmit the indicium to a list of pseudo-reader panels (107a through 107n) specific to the Facility Code.

The network access panel (110a through 110n) details are shown in FIG. 5. The panel comprises reader network processor 501, voltage source 507, first, second, and third connections 510, 511, and 512, first and second I/O pins 513 and 515, first and second input buffers 514 and 516, first and second pull up resistors 508 and 509, fourth, fifth, and sixth connections 517, 518, and 519, third and fourth I/O pins 521 and 523, and first and second output buffers 520 and 522.

The reader network processor 501 ties to the network 112 via first network cable 526. The Weigand interface for the reader is comprised of a "1" input at first connection 510, a "0" input at second connection 511, and a ground return at third connection 512. These lines are carried within processor connection 525 which connects to the credential reader 528. Power and indication lines are also typically carried within the processor connection 526, but these have been omitted for clarity.

In accord with common practice, first and second pull-up resistors 508 and 509 provide current from a 5V voltage source 507 at the access panel. The optimal values of these resistors are determined by the reader manufacturer, but a typical value is 560 ohms. The input signals are conditioned by first and second input buffers 514 and 516, which are typically Schmitt buffers, to provide proper electrical levels to network processor inputs at first and second I/O pins 513 and 515. As is known to those skilled in the art, ordinary buffers, may be used in lieu of the Schmitt buffers in certain applications. Additionally, the buffers may be incorporated into the reader network processor 501.

The pseudo-reader output is comprised of fourth, fifth, and sixth connections 517, 518, and 519, third and fouth I/O pins 521 and 523, and first and second open collector output buffers 520 and 522. The Weigand interface for the legacy control panel 527 is comprised of a "1" output at fourth connection 517, a "0" output at fifth connection 518, and a ground return at sixth connection 519. These lines are carried within the control panel connections cable 524 which connects to the legacy control panel 527. Power and indication lines are also typically carried within the control panel connections cable 524, but these have been omitted for clarity.

Because FIG. 5 is used to illustrate the logical flow of the invention's process, surge suppression circuitry typically included for electrical connections from field equipment has also been omitted for clarity.

When network enabled reader processor (110a through 110n) receives a pseudo-credential message 750, the pseudo-credential indicium is extracted and processed just as if the pseudo-credential had been presented to the associated reader (201a through 201n) in the prior art. That indicium is reflected to the building management legacy monitoring computer 204 via the building management legacy access control panel (202a through 202n). The building management legacy monitoring computer 204 responds with a string to resource control panel (208a through 208n), releasing the appropriate resource partitions.

An alternative embodiment uses the origin of a "Grant Message" 710 to form the pseudo-credential associated with that receiver within the originating panel. The originating panel consults a list which associates the origin of the "Grant Message" with the generation and transmission of a pseudo-credential. The access control system processes that pseudo-credential indicium (755a through 755n) as it would an ordinary credential, with the pseudo-credential's indicium, presented to the credential reader 201 in the prior art.

An alternative embodiment to provide an anti-fraud capability may incorporate a list of potential pseudo-credentials within the reader processor (110a through 110n). The reader processor (110a through 110n) consults that list and discards any real credential reads with a pseudo-credential indicium.

Referring to FIG. 6, the pseudo reader network processor 601 is connected to the network 112 via second network cables 626. Pseudo-reader panels (107a through 107n) comprise pseudo reader network processor 601, pull up voltage source 610, first through seventh reader connections 614, 615, 616, 617, 618, 619 and 620, first through fifth reader I/O pins 602, 604, 606, 608 and 621, first, second, and third input buffers 607, 609, and 622, first and second open collector reader output buffers 603, 605 and first, second, and third pull up reader resistors 611, 612, and 613.

The pseudo-reader output that mimics a Weigand output is composed of first and second open collector reader output buffers 603 and 605, presenting open collector outputs to the tenant's legacy access control panel 623 at first and third connections 614 and 616. A ground return is provided at second reader connection 615. All three signal lines connect with the tenant's legacy access control panel 623 via first panel connection 625. In an alternative embodiment of this invention, buffers driven by network processor output lines at first and second reader I/O pins 602 and 604 are incorporated into the pseudo reader network processor 601 itself. One implementation may employ two sections of a TTL Hex Buffer, commonly known as a 7407, or its equivalent as the output buffer.

Another implementation of the buffer may use two NPN transistors. (not shown). In that configuration, two resistors would connect the respective bases of the transistors to the respective network processor output lines at first and second reader I/O pins 602 and 604, limiting the current flowing from the network processor output lines at first and second reader I/O pins 602 and 604 into the bases of the transistors. The transistor collectors would connect to the respective output points at first and third reader connections 614 and 616, and the transistor emitters would connect to ground at second reader connection 615.

Yet another embodiment of this invention uses the network processor output lines at first and second reader I/O pins 602 and 604 directly as the open collector buffering circuitry is incorporated into certain network processor outputs.

Weigand card reader inputs on an access control panel provide a current source through pull-up resistors and the access control panel monitors the circuits for closures of forty to seventy microseconds to ground. Each closure to ground indicating either a "1" or a "0" bit, as documented in Mr. Sprik's AN004.DOC on page 9. Each pulse is separated by an idle period of two milliseconds. The state is undefined if both lines are closed to ground at the same time.

Pseudo reader network processor 601 transmits a "1"s bit by pulsing the buffer associated with the third reader connection 616. The buffer associated with first reader connection 614 transmits a "0" bit when it is pulsed.

The network processor inputs at third, fourth, and fifth reader I/O pins 606, 608, and 621 monitor the tenant's legacy access control panel outputs for Grant, Deny, and Handicap. First, second, and third input buffers 607, 609, and 622, preferably Schmitt buffers, condition the signals to satisfy the input requirements of the pseudo reader network processor 601.

The tenant's legacy access control panel 623 relay outputs connect with input terminals at fourth, fifth, and seventh reader connections 617, 618, 620 and a ground return at sixth reader connection 619 via second panel coupler 624. The Grant relay lower contact is connected to ground at sixth reader connection 619 and the upper contact is tied to fourth reader connection 617. Second reader pull up resistor's 612 top terminal is tied to the pull up voltage source 610. When the tenant's legacy access control panel 623 Grant relay is relaxed, the voltage at fourth reader connection 617 is pulled by second reader pull up resistor 612 to a value near that of the pull up voltage source 610. When the tenant's legacy access control panel 623 Grant relay is energized, the voltage at fourth reader connection 617 is brought to ground by the closure of contacts. First reader input buffer 607 adjusts this signal to the level appropriate for the pseudo reader network processor's 601 input at third reader I/O pin 606. As described above, when this contact closure is detected, either a "Pseudo-Credential Message" and/or a "Grant Message" will be generated and transmitted by the pseudo reader network processor 601 over the network 112. This "Pseudo-Credential Message" and/or the "Grant Message," in certain embodiments of this invention, is echoed to a audit computer 115 for audit purposes.

FIG. 6 shows Schmitt buffers as first, second, and third input buffers 607, 609, and 622 to condition the relay contact outputs of the tenant's legacy access control panel 202. Alternative embodiments of this invention may employ either an ordinary buffer or a buffer incorporating de-bounce circuitry as required by the output characteristics from the tenant's legacy access control panel 202.

Referring to FIG. 7, the possible network message coding is presented. First message 710 is an example indicium message 403. First multi-byte field 701 is the network message preamble required by network protocols. In embodiments in which UDP/IP (universal datagram protocol/internet protocol) is employed, first multi-byte field 701 would contain the source computer identifier and routing information used by the network.

Additional information fields in the UDP/IP preamble are the message length and message error checking. Similarly, second multi-byte field 702 is the message post amble and in some network protocols contains error checking and other information. In UDP/IP, this field is null. First single-byte field 713 is the species code indicating the message type. In this example, the ASCII character "c" shown as hexadecimal "63" indicates a Credential Request. First two-byte field 704 indicates the number of bits in the credential. Third multi-byte field (705a through 705n) is the right justified bits of the credential indicium, shown in FIG. 7 as two digit hexadecimal numbers indicating the byte values. The credential indicium used as an example in these diagrams is the same as shown in FIG. 3A and FIG. 3B, a 26 bit card with a Facility Code 159 and Personal Identifier 2199.

Second message 720 is an example of a grant message. First and second multi-byte fields 701 and 702 are the network message preamble and post amble described above. Second single-byte field 723 is the species code indicating the message type. In this example, the ASCII character "g" shown as hexadecimal "67" indicates a grant message. First two-byte field 704 shown indicates the number of bits in the credential. Third multi-byte field (705a through 705n) is the right justified bits of the credential indicium, shown here with two digit hexadecimal numbers indicating the byte values.

Third message 730 is an example of a deny message format. First and second multi-byte fields 701 and 702 are the network message preamble and post amble described above. Third single-byte field 733 is the species code indicating the message type. In this example, the ASCII character "d" shown as hexadecimal "64" indicates a deny message. First two-byte field 704 indicates the number of bits in the credential. Third multi-byte field (705a through 705n) shown is the right justified bits of the credential indicium, shown here as two digit hexadecimal numbers indicating the byte values.

Fourth message 740 is an embodiment of a handicap message. First and second multi-byte fields 701 and 702 are the network message preamble and post amble described above. Fourth single-byte field 743 is the species code indicating the message type. In this example, the ASCII character "h" shown as hexadecimal "68" indicates a handicap message. First two-byte field 704 indicates the number of bits in the credential. Third multi-byte field (705a through 705n) shown is the right justified bits of the credential indicium, shown here as two digit hexadecimal numbers indicating the byte values.

Fifth message 750 is an example of a virtual card read message. First and second multi-byte fields 701 and 702 are the network message preamble and post amble described above. Fifth single-byte field 753 is the species code indicating the message type. In this example, the ASCII character "v" shown as hexadecimal "76" indicates a virtual card read message. First two-byte field 704 indicates the number of bits in the original credential. Third multi-byte field (705a through 705n) is the right justified bits of the original credential indicium, shown here as two digit hexadecimal numbers indicating the byte values. Second two-byte field 754 indicates the number of bits in the pseudo-credential. Fourth multi-byte field (755a through 755n) shown is the right justified bits of the pseudo-credential.

An alternative embodiment of the third multi-byte field (705a through 705n), may use the credential read time, a timer identifier, and/or the credential indicium to produce a unique identifier for the transaction. As an additional alternative, indicium message 403 and pseudo-credential message 432 may be marked with unique numbers in addition to third multi-byte fields 705a through 705n, and with such marking incorporated in first, second, third, and fourth messages 710, 720, 730, and 740. These unique markings may incorporate the time of credential read event 401. Doing so could allow replacing the reader processor timer expired test 407 with a comparison of the original event time against the current time, further allowing elimination of the need to start reader processor transaction timer 404.

Referring to FIG. 5 and FIG. 6, typical examples of reader network processor 501 and pseudo reader network processor 601 may be found in either the Lantronics, Inc. XPORT Embedded Ethernet Device Server (see, for example, http://www.lantronix.com/pdf/XPort_PB.pdf) or the Digi International Inc. ME connector style embedded module. (see http://www.digi.com/pdf/prd_ds_digiconnectme.pdf) An alternative embodiment of these network processors may be implemented as microprocessor coupled with a network enabling peripheral.

An alternative embodiment of the network enabled reader processor (110a through 110n), reader network processor 501, or pseudo reader network processor 601 moves the credential indicium output generation into a secondary processor or programmable logic array. An example of a secondary processor would be found in the Texas Instruments MSP430 family of processors. (http://-focus.ti.com/lit/sg/slab034t.pdf) Upon reception of a command from the network processor, the secondary processor would generate the pseudo-reader pulses and/or monitor the legacy access control panel's outputs. The offloading of the pulse generation and/or input monitoring may offer cost or other advantages over using a single higher speed processor with five I/O pins as illustrated in FIGS. 5 and 6. The two processors may be interconnected with any one of a number of techniques known to those skilled in the art. Interconnection techniques between two processors include, without limitation, serial I/O, SPI, and I²C protocols.

An alternative embodiment of the network enabled reader processor (110a through 110n) separates the credential indicium output generation at fourth fifth and sixth connection 517, 518 and 519 of FIG. 5 and the reader input at first, second, and third connections 510, 511 and 512 into separate processors or programmable logic arrays.

An alternative embodiment of the network enabled reader processor (110a through 110n) output at fourth fifth and sixth connection 517, 518 and 519 of FIG. 5 is directly combined with the legacy reader output (201a through 201n). For a system using the Weigand standard for reader communications, a combining technique known as "wired or" is known to those skilled in the art. Utilizing this combining technique would allow all credential indicia to be passed unchanged to the legacy building system while providing for the injection of the virtual indicium to the legacy building system. As is known to those skilled in the art similar techniques can be employed for other types of reader outputs.

As known by those skilled in the art the selection criterion at steps 449 and 422 of FIG. 4 is typically the Facility Code. Alternative embodiments of the selection criteria may includes the number of indicium bits, subsets of the individual's personal identification number, time of day, the parity polarity, or such other information selected by the system designer or programmer.

Moreover, though the description of the invention has included description of one or more embodiments and certain variation and modifications, other variations and modifications are within the scope of the invention. For example, without limitation, network based interconnections described herein may be wired, wireless, or a combination of such connections. Thus, references to "communication lines" and "connections" may not involve physical cables. Additionally, references to communication lines or connections "a . . . n" is by way of example only, and is not intended to suggest that a particular number of such connections is required. Accordingly, the above descriptions are not limiting of the invention as claimed below.

I claim:

1. A method for determining access rights to a select portion or resource of a building having a building access control system capable of selectively allowing access to a portion or resource of the building, wherein said building houses one or more tenants, having one or more tenant-operated access control systems, the method comprising the steps of:
   obtaining, at a first computer in signal communication with a credential reader, a first indicium from a tenant credential via said credential reader;
   transmitting said first indicium to said tenant-operated access control systems via a pseudo reader in signal communication with said first computer;
   if one of said tenant-operated access control systems determines that said first indicium is valid, receiving, at said pseudo-reader, from said one tenant-operated access control system an indication that said first indicium is valid;
   upon receipt of said indication,
   generating, by the pseudo-reader, a second indicium formatted to be compatible with said building access control system;
   transmitting said second indicium to said building access control system; and
   thereby allowing access to the selected portion or resource of the building upon receiving said second indicium by said building access control system.

2. The method of claim 1, wherein the step of transmitting said first indicium to said tenant-operated access control systems comprises the step of directing a network based transmission to said pseudo reader.

3. The method of claim 1, wherein the step of transmitting the second indicium to said building access control system comprises the step of directing said signal via a network based transmission.

4. The method of claim 1, further comprising:
   waiting for a predetermined time after transmitting said first indicium to receive said second indicium; and
   if said second indicium is not received within said predetermined time, denying access to the building or to the selected portion or resource of the building.

5. The method of claim 1, further comprising allowing access to areas leased by a tenant whose tenant-operated access control system provided said indication that said first indicium is valid.

6. The method of claim 1, additionally comprising the step of coding said second indicium to indicate that access should be granted.

7. The method of claim 1, additionally comprising the step of coding said second indicium to indicate that access should be denied.

8. The method of claim 1, additionally comprising the step of coding said second indicium to indicate that access should be granted to a handicapped person.

9. The method of claim 1, additionally comprising the step of denying access to said building or its resources if said first indicium is identical to a valid second indicium.

10. The method of claim 9, additionally comprising the step of coding said second indicium to indicate that access should be denied.

11. The method of claim 1, wherein the step of allowing access to the selected portion or resource of the building includes the step of allowing use of elevators within the building.

12. The method of claim 1, further comprising providing additional audit information to said building access control system.

13. A system for controlling access to select portions or resources of a building, wherein said building houses one or more tenants, said system comprising:
   a credential reader capable of receiving a first indicium from a tenant credential;
   a first computer in signal communication with said credential reader;
   one or more tenant-operated access control systems comprising a tenant interface in signal communication with a pseudo reader;
   and
   a building access control system in signal communication with said pseudo-reader;
   wherein said credential reader provides said first indicium to said first computer; said first computer provides said first indicium to said one or more tenant-operated access control systems via said pseudo reader to said tenant interface;
   one of said tenant-operated access control systems provides a signal to said pseudo-reader if said first indicium is valid; and
   said pseudo-reader, on receipt of said signal, provides to said building access control system a second indicium formatted to be compatible with said building access control system to allow access to the selected portions or resources of the building upon receiving said second indicium by said building access control system.

14. The system of claim 13, wherein said signal communication between said first computer and said tenant-operated access control system is provided via a network.

15. The system of claim 13, wherein said signal communication between said one or more tenant-operated access control systems and pseudo-reader is provided via a network.

16. The system of claim 13, wherein said signal communication between said first computer and said one or more tenant-operated access control systems is encoded.

17. The system of claim 13, wherein said building access control system denies access to the building upon expiration of a predetermined period after said first indicium is provided to said one or more tenant-operated access control systems.

18. The system of claim 13, wherein said second indicium comprises coding indicating that access, should be granted.

19. The system of claim 13, wherein said second indicium comprises coding indicating that access should be denied.

20. The system of claim 13, wherein said second indicium comprises coding indicating that access should be granted to a handicapped person.

21. The system of claim 13, wherein said building access control system denies access if said first indicium is identical to a valid second indicium.

* * * * *